United States Patent
Schechter et al.

(10) Patent No.: US 9,500,532 B2
(45) Date of Patent: Nov. 22, 2016

(54) TEMPERATURE MONITORING WITH SIMULATED THERMAL BUFFER

(71) Applicant: Schechter Tech, LLC, Boston, MA (US)

(72) Inventors: Harry J. Schechter, Needham, MA (US); Philip Trapasso, Brighton, MA (US)

(73) Assignee: Schechter Tech, LLC, Boston, MA (US)

( * ) Notice: Subject to any disclaimer, the term of this patent is extended or adjusted under 35 U.S.C. 154(b) by 24 days.

(21) Appl. No.: 14/180,791

(22) Filed: Feb. 14, 2014

(65) Prior Publication Data

US 2015/0213162 A1    Jul. 30, 2015

Related U.S. Application Data

(60) Provisional application No. 61/933,782, filed on Jan. 30, 2014.

(51) Int. Cl.
G08B 17/00 (2006.01)
G01K 1/02 (2006.01)

(52) U.S. Cl.
CPC .................................. G01K 1/02 (2013.01)

(58) Field of Classification Search
CPC ....... F25D 29/008; G08B 17/06; G08B 5/22; G06G 7/48; G08F 17/50; G08F 15/16; G08F 9/44
USPC ....... 340/585, 584, 588, 589, 514, 515, 506; 62/246, 176.6; 703/9, 13, 6
See application file for complete search history.

(56) References Cited

U.S. PATENT DOCUMENTS

| | | | |
|---|---|---|---|
| 3,690,175 A | 9/1972 | Butts | |
| 4,003,124 A | 1/1977 | Connick | |
| 4,293,916 A * | 10/1981 | Del Re et al. | 703/6 |
| 4,468,135 A | 8/1984 | McCain et al. | |
| 5,355,686 A * | 10/1994 | Weiss | F25D 17/065 62/158 |
| 6,502,409 B1 | 1/2003 | Gatling et al. | |
| 6,976,368 B1 | 12/2005 | Lamstaes et al. | |

(Continued)

OTHER PUBLICATIONS http://temprotect.com/action/shop/viewitem/?itemType=72&name=Glycol%20Buffer%20Vial, downloaded Jul. 9, 2014.
http://www.vfcdataloggers.com/probevial-1.aspx, Copyright 2014 Dataloggers, downloaded May 1, 2014.

(Continued)

*Primary Examiner* — Hoi Lau
(74) *Attorney, Agent, or Firm* — Wolf, Greenfield & Sacks, P.C.

(57) ABSTRACT

An environmental monitoring system that processes at least one report from at least one environmental sensor in the environment. The system comprises a computing device configured to compute, based on values of physical properties of a simulated object and the at least one report, a simulated condition of the simulated object within the environment. The computing device is also configured to compare the simulated condition to a criterion. The computing device is further configured to selectively output an indication of an alarm condition based on the comparing. The computing device may also be configured to receive through a user interface an input of the values of the physical properties of the simulated object. The environment may be managed by a user, and the computing device may be further configured to associate input with an account based on credentials issued to a user for the account. A method for operating the computing device.

23 Claims, 8 Drawing Sheets

(56) References Cited

U.S. PATENT DOCUMENTS

| | | | |
|---|---|---|---|
| 7,952,485 B2 | 5/2011 | Schechter et al. | |
| 8,248,252 B2 | 8/2012 | Schechter et al. | |
| 8,353,870 B2* | 1/2013 | Levin | A61M 1/367 604/113 |
| 8,547,226 B2 | 10/2013 | Schechter et al. | |
| 8,599,012 B2 | 12/2013 | Schechter et al. | |
| 8,779,926 B2 | 7/2014 | Schechter | |
| 2007/0006604 A1* | 1/2007 | Behr | 62/246 |
| 2008/0129465 A1* | 6/2008 | Rao | A61B 5/0031 340/286.02 |
| 2011/0060571 A1* | 3/2011 | Ueda | G06F 17/5004 703/9 |
| 2011/0068929 A1* | 3/2011 | Franz | A61B 5/02055 340/573.1 |
| 2012/0109449 A1* | 5/2012 | Boehme | B60C 23/0476 701/34.4 |
| 2013/0147630 A1* | 6/2013 | Nakaya | G08B 5/22 340/691.6 |
| 2013/0311140 A1 | 11/2013 | Schechter | |
| 2014/0033759 A1* | 2/2014 | Ide et al. | 62/457.2 |
| 2014/0107993 A1* | 4/2014 | Cheng | G05B 17/02 703/13 |
| 2014/0278332 A1* | 9/2014 | Grammatikakis | G06F 17/5009 703/18 |

OTHER PUBLICATIONS http://temprotect.com/action/shop/viewitem/?itemType=72&name=Glycol%20Buffer%20Vial, downloaded May 1, 2014.

http://www.fishersci.com/ecomm/servlet/itemdetail?catnum=NC0278993&storeid=10652, copyright 2014, downloaded May 1, 2014.

http://www.bapihvac.com/CatalogPDFs/1_App_Notes/Thermal_Buffer_Temp_Sensing.pdf, Rev. Mar. 3, 2008, downloaded May 1, 2014.

http://www.prweb.com/releases/refrigeration/efficiency/prweb10684359.htm, downloaded May 1, 2014.

http://www.kele.com/temperature-sensors-and-transmitters/as10-series.aspx, downloaded May 1, 2014.

http://www.thermcoproductsinc.com/vaccine-thermometers.html, downloaded May 1, 2014.

http://www.dicksondata.com/products/WFT21, downloaded May 1, 2014.

* cited by examiner

FIG. 6

| Variable | Unit | Symbol |
|---|---|---|
| Convection Coefficient | W/(m²·K) | $h$ |
| Surface Area | m² | $A_s$ |
| Mass | Kg | $m$ |
| Specific Heat | J/(Kg·K) | $c_p$ |
| Time Interval | s | $t_{int}$ |
| Temperature (measured) | °C | $T_{prev}$ |
| | | $T_{new}$ |

FIG. 7

TEMPERATURE MONITORING WITH SIMULATED THERMAL BUFFER

RELATED APPLICATIONS

This application claims priority under 35 U.S.C. §119(e) to U.S. Provisional Application Ser. No. 61/933,782, entitled "TEMPERATURE MONITORING WITH SIMULATED THERMAL BUFFER" filed on Jan. 30, 2014, which is incorporated herein by reference in its entirety.

BACKGROUND

Temperature monitoring is used in many industries. For example, restaurants and food processing companies that rely on refrigeration equipment to keep their products fresh frequently use temperature monitoring. If a malfunction of the refrigeration equipment is not detected promptly, food could and does get either too hot or too cold, resulting in damage to the food products. For a business that relies on food, such damage could result in a large monetary loss and potentially a serious business disruption.

As another example, companies that operate servers or other computer equipment may also monitor temperature of their equipment. Sometimes, a malfunctioning component of the computer equipment will generate excessive heat. Thus, a temperature increase may indicate a defect that may need to be corrected. Also, excessive heat generated by the equipment may cause components to fail because they are operating beyond their proper operating temperatures.

Temperature monitoring systems are known. These systems incorporate temperature sensors attached to or mounted near equipment for which temperature is to be monitored. The system responds if the temperature sensor indicates a temperature outside of a normal operating range. One type of response that has been used is to raise an alarm at a facility where the monitored equipment is located. Some systems use bells, flashing lights, or other forms of audible or visible indications of an improper operating temperature.

SUMMARY

Some embodiments provide a method of operating a computing device of an environmental monitoring system, the computing device processing at least one report from at least one environmental sensor in the environment. The method may comprise computing, based on values of physical properties of a simulated object and the at least one report, a simulated condition of the simulated object within the environment; comparing the simulated condition to a criterion; and selectively outputting an indication of an alarm condition based on the comparing.

In some embodiments, there is provided at least one computer-readable storage medium encoded with computer-executable instructions that, when executed by at least one computer, cause the at least one computer to carry out a method of operating a computing device of an environmental monitoring system, the computing device processing at least one report from at least one environmental sensor in the environment. The method may comprise computing, based on values of physical properties of a simulated object and the at least one report, a simulated condition of the simulated object within the environment; comparing the simulated condition to a criterion; and selectively outputting an indication of an alarm condition based on the comparing.

Further embodiments provide an environmental monitoring system that processes at least one report from at least one environmental sensor in the environment. The environmental monitoring system may comprise a computing device configured to compute, based on values of physical properties of a simulated object and the at least one report, a simulated condition of the simulated object within the environment; compare the simulated condition to a criterion; and selectively output an indication of an alarm condition based on the comparing.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 is a sketch of an exemplary graphical user interface that may be presented by the system of FIG. 2 to a user;

FIG. 7 is a table illustrating the fields of an exemplary database that may be used with some embodiments.

DETAILED DESCRIPTION

Figure 1A:
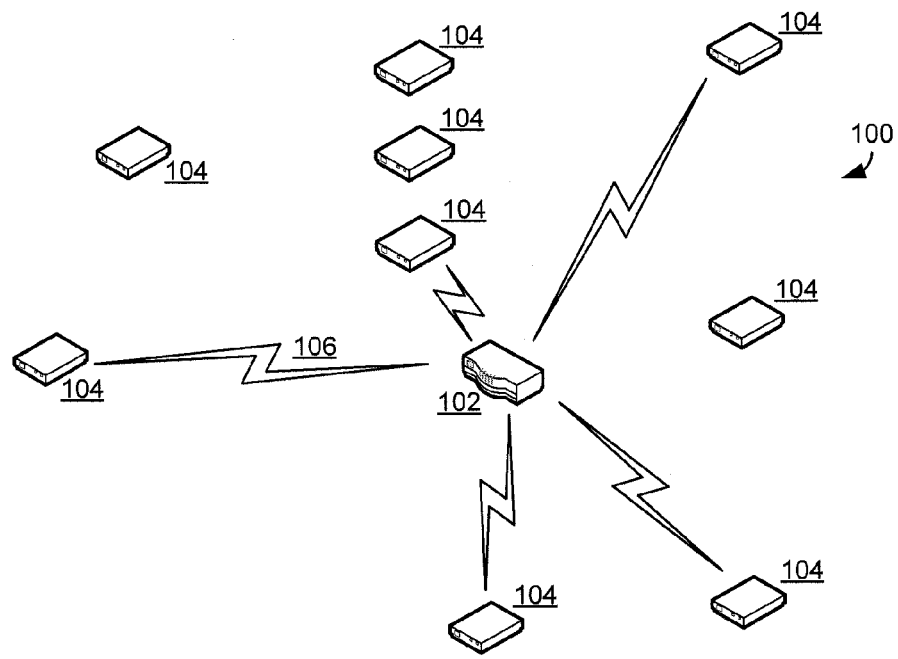
FIGS. 1A and 1B are illustrations of an exemplary environmental sensor network that may be used in an environment.

The inventors have recognized and appreciated that an environmental monitoring system may be more valuable with a capability to simulate a condition of an object within the environment based on measured environmental conditions. The system may output information about the monitored environment based on a comparison of the simulated condition to a threshold or other criteria. Such an approach enables environmental sensors to be simply and easily deployed.

In some scenarios, monitoring the temperature within an object, or other characteristic influenced by environment conditions, may be important. In accordance with some embodiments described herein, rather than developing a sensor to measure conditions within an object, a simple and easily deployed sensor may be used to provide information indicative of a condition within an object. The function of those sensors may be tailored by configuring data processing equipment to simulate the response of an object to environmental conditions. The simple and easily deployed sensors may measure the environmental conductions, and the system may, using the simulation, compute the characteristic within an object.

In some embodiments, the environment may be a refrigerator, processing oven, or other temperature controlled environment. The characteristic of interest may be temperature. One or more temperature sensors may be deployed in the environment. A data processing system, receiving and processing readings from the temperature sensors, may compute the internal temperature of a simulated object within the environment. That simulated temperature may be compared to temperature/condition alarm limits of a product that might be stored in that environment.

As a specific example, the refrigerator may be intended to store vials of medicine at a controlled temperature. The simulated object may represent a vial of fluid, which may be characteristic of the medicine. The data processing system may be configured with values of physical properties that characterize the simulated vial. As sensor readings are provided to the data processing system, these properties may be used to compute a condition, such as the temperature of the liquid, in the simulated vial. This temperature may be compared to alarm limits indicating whether the fluid within the vial has become hotter or colder than specifications for the medicine.

Solutions for monitoring conditions of a product traditionally have involved measuring environmental conditions of physical objects. Measurements might be made on an object of interest or on a substitute physical object of approximately the same size and made with materials of similar thermal characteristics. Such objects might be more readily instrumented with a sensor than the actual object, but would respond to environmental conditions in a similar fashion.

The inventors have recognized and appreciated that, even when these substitute physical objects are used, there are several disadvantages. Users may store a variety of products in different sized containers, and each product may have unique thermal properties, while substitute physical objects may generally be available in limited sizes and may not be representative of the range of products stored by users. For example, if user A is storing a vaccine in a 10 milliliter (mL) vial and user B is storing beer in a 56,000 mL keg, one physical object may not be representative of both users' products to an acceptable accuracy.

The inventors have recognized and appreciated the advantages of an environmental monitoring system with a virtual thermal buffer that uses the thermal properties of a product to simulate environmental conditions of the product. Such a virtual thermal buffer may be adjusted to represent or match a user's specific product. In the example described above, a simulated object may be adjusted to represent or match user A's 10 mL vial of vaccine or user B's 56,000 mL keg of beer, each to an acceptable accuracy. In accordance with some embodiments, such adjustments may be made by providing configuration inputs into a computing system or in any other suitable way.

Moreover, simulating a response of an object to environmental conditions avoids the need to develop a sensor that is embedded within an object. Making a sensor that mounts in a dry location, for example, may be simpler and less expensive than manufacturing a sensor adapted for insertion in a vial or other fluid.

Such an approach may be applied in connection with an environmental monitoring system that monitors environmental conditions in multiple locations for multiple users. Each user may use the same type of sensor configured to communicate with a data processing device, such as a server. Each user may specify, such as by providing data through a server website, values of physical properties of a simulated object. Each user may also specify alarm limits associated with conditions of the simulated object. The data processing device may process sensor measurements received from an environment operated by a user, compute a condition of the simulated object, as specified by that user, and compare a computed condition of the simulated object to alarm limits provided by that user. The system may conditionally take an action, based on the result of that comparison. The action taken by the system, such as sending a message, may also be configured by that user.

Described herein are techniques for computing, using a computing device, a simulated condition of a simulated object within an environment based on values of physical properties of the simulated object and at least one report from at least one environmental sensor in the environment; comparing the simulated condition to a criterion; and selectively outputting an indication of an alarm condition based on the comparing. In some embodiments, the simulated condition of the simulated object may be a simulated temperature, air quality, moisture level(s), or any other suitable condition. The at least one report may be multiple instances of a measured temperature, air quality, moisture level(s), and/or any other condition. The simulated object may be a fluid, a solid, a gas, or any other suitable type or state of matter. It may be a medical product (e.g., a vaccine) or food product (e.g., beer) or anything else that is suitable. The simulated object may react in various different ways to changes in the air or other conditions or to any other suitable occurrence or state.

The environment may be any type of location, including the many described throughout this specification. The physical properties may be the convection coefficient, surface area, mass, and/or specific heat of the simulated object, or any other suitable property. The criterion may be limits on temperature or other condition provided by a user or otherwise known by a system to act as alarm limits. For example, if a medical product will only be usable if kept within a certain temperature range, but it is stored in a refrigeration unit in which the temperature is often or always changing (due to door movement or compressor cycling), the user may set as alarm limits the boundaries of that temperature range. According to some embodiments, the system or servers may output an indication of an alarm condition to the user, to an interface the user may view or operate, or in any other suitable way if the simulated temperature of a simulated object simulating the medical product goes beyond the alarm limits. The indication of the alarm condition may be data transmitted to be displayed in the user interface or directly to the user in a message such as one via Short Message Service (SMS). It may trigger an audible or visual alarm on a device or trigger another operation that can signal that a condition in the monitored environment has passed the alarm limit.

In some embodiments, an environmental monitoring system may comprise one or more sensor units disposed in an environment and one or more servers. The environment in which the sensors are disposed may be managed by a user. The servers may receive from the user an input of the values of the physical properties of the simulated object. In such an environment, the user may provide input through a user interface of a computing device that is coupled to the server over a network, such as the Internet.

Any suitable user interface may be used. For example, the input may be direct input of the values or selection of the values from a list. The input may be a selection of the simulated object with some predetermined values of the physical properties (e.g., 60 mL of propylene glycol). The input may be associated with an account based on credentials issued to the user for the account. The account may be an account created in person or over the Internet or telephone or through any other means. The credentials may be a username and password, a personal identification number, a one-time-use code, or any combination thereof or any other suitable credentials.

According to some embodiments, computing the simulated condition of the simulated object may include selecting a type of model for the simulated object that may be based on characteristics of the object being simulated. For example, a method of monitoring as described herein may include selecting a model of the simulated object such that the simulated object behaves isothermally or transiently (that is, whether it may be simulated using an isothermal or a transient model, respectively). An effectively isothermal object's temperature at its edge may be practically the same as the temperature at its center, whereas an effectively transient object temperature may have a more noticeable difference (a gradient) between the temperature at its edge and the temperature at its center than an effectively isothermal object.

If the simulated object is to behave transiently, the transient response may be influenced by selection of a model with a desired transient response. The model may be selected in any suitable way. In some embodiments, for example, a user may designate a model from a predefined model library. Such a selection may be based on user input directly specifying a model in the library or by the user specifying the object, or characteristics of the object, to be simulated. Alternatively, the user may input an equation representing the transient response to be modeled.

In some embodiments, the appropriate model may be determined from values of physical properties of the simulated object. Such values may be input by a user, either directly or indirectly by specifying characteristics of the simulated object that the system may convert to values of physical properties. As a specific example, values of physical properties may be used to calculate a number, which may be a ratio of values of properties of the simulated object, such as a Biot number:

$$Bi = \frac{hA_s}{kV} \quad \text{(Equation 1)}$$

where $A_s$ may be the surface area of the simulated object, V may be its volume, k may be its conduction coefficient, and h may be its convection coefficient. Values of any or all of these parameters may be predetermined, input directly by a user, or derived in some other way, such as by lookup in a material property table based on a material specified by a user. In some embodiments, if the Biot number is equal to or less than 0.1, then the product may be simulated using an isothermal model. Otherwise, a transient model may be used.

For some embodiments, FIG. 7 illustrates variables that may be applied to an equation to generate an isothermal model to calculate the simulated temperature of the simulated object. An equation that may be used to make such a calculation may be as follows (first computation method or model):

$$\text{Simulated Temperature} = e^{-\frac{hA_s}{mc_p}t_{int}} \cdot (T_{prev} - T_{new}) + T_{new} \quad \text{(Equation 2)}$$

where m may be the mass of the simulated object, $c_p$ may be its specific heat, $t_{int}$ may be the time between temperature samples, $T_{prev}$ may be a first measured temperature of the air, and $T_{new}$ may be a second measured temperature of the air, which may be measured at $t_{int}$ after the first measured temperature is measured. In other words, the system or servers may use multiple instances of air temperature measurements to calculate the simulated temperature of the simulated object. A first air temperature measurement may be assigned the variable $T_{prev}$. When the next air temperature reading is taken, it may be assigned the variable $T_{new}$. These two temperature readings, along with the other listed variables, may be used to solve for the simulated temperature of the simulated object. When a new air temperature measurement is taken, it may replace the current $T_{new}$, and the previously calculated simulated temperature may become $T_{prev}$.

If the simulated object does not behave isothermally, computing the simulated condition of the simulated object may involve using a second computation method or model. The second model may use a different equation in which a value representing a temperature is calculated using an equation that linearly combines values of parameters, such as convection coefficient, surface area, mass, and specific heat.

The techniques described herein may be implemented in any suitable manner. Described below are exemplary implementations of these techniques, though these examples are merely illustrative of the various ways in which embodiments may operate. It should be appreciated that embodiments are not limited to operating in accordance with these examples.

In some examples below, an environmental monitoring system is described that monitors a temperature of an environment. It should be appreciated, however, that embodiments may monitor any suitable conditions of an environment and that embodiments may monitor other conditions in addition to or instead of monitoring temperature, as described above. A condition of an environment may include any suitable characteristic of the environment that may be monitored, such as meteorological characteristic of the environment. An environment could be any suitable area including liquids, gases, and/or solids that may be inside a building and/or outside a building. The conditions of any liquids, gases, or solids of the environment can be monitored as conditions of the environment. Temperature, air quality, and moisture levels are examples of environmental conditions that may be monitored.

Further, in some examples below, an environmental monitoring system is described that is disposed in an environment that includes the interior of a building. It should be appreciated, however, that embodiments are not limited to operating in any particular environments and that environmental monitoring systems may be implemented that monitor conditions in environments that are indoors, outdoors, or a combination of indoors and outdoors.

Exemplary environmental sensor networks and exemplary environmental monitoring systems are described below in connection with FIGS. 1A, 1B, and 2. However, it should be appreciated that embodiments are not limited to operating with any specific sensor units, sensor networks, or monitoring systems. In some embodiments, the sensor units and monitoring systems may be implemented in accordance with the sensor units and monitoring systems disclosed in U.S. Pat. No. 7,952,485, titled "Remote Monitoring System" and filed on Nov. 21, 2008, and disclosed in U.S. Patent App. Publication No. 2010/0127881, titled "Remote Monitoring System" and filed on Nov. 21, 2008, each of which is hereby incorporated by reference in their entirety and at least for their discussion of sensor units and monitoring systems.

Figure 1B:
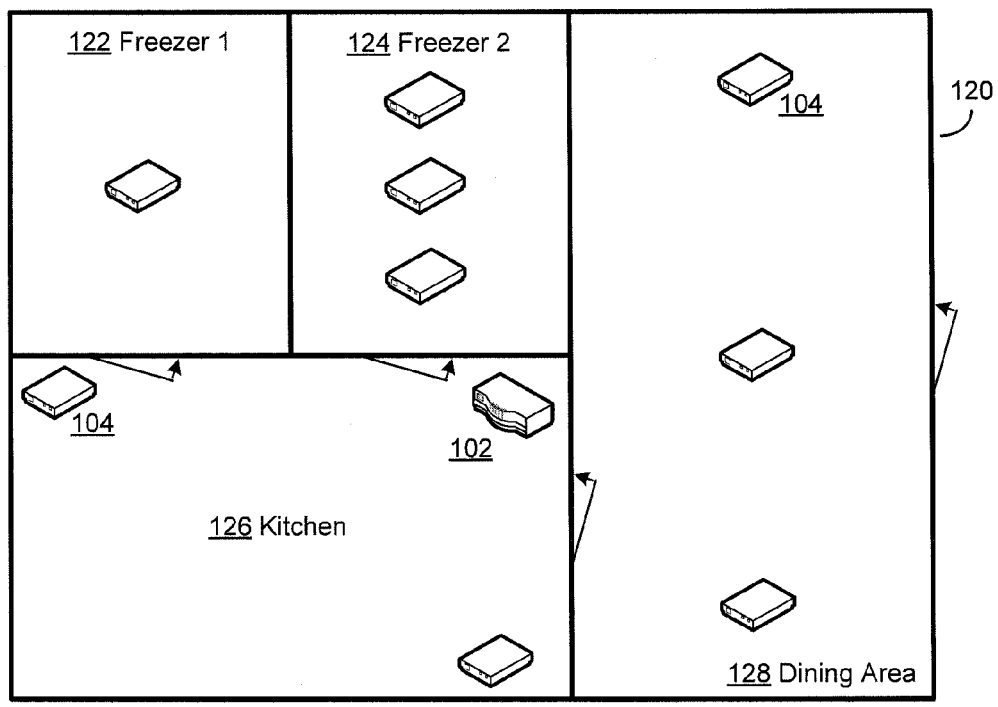

FIG. 1A illustrates an example of an environmental sensor network of an environmental monitoring system with which some embodiments may operate. An environmental sensor network collects data regarding at least one condition of an environment in which the environmental sensor network is located. The environmental sensor network 100 of FIG. 1A includes at least one base station 102 and multiple sensor units 104 that monitor and collect data regarding at least one condition of an environment in which the network 100 is disposed. The base station 102 is capable of communicating wirelessly, via a wireless signal 106, with each of the sensor units 104, and acts as a relay device to communicate information about and from the sensor units 104 to other computing devices outside the environment using a wired and/or wireless communication medium. The base station 102 may be any suitable computing device, including a device that is dedicated to wirelessly relaying information received from sensor units 104 or a device that is capable of wirelessly relaying information received from sensor units 104. In some embodiments, for example, the base station 102 may be a cellular telephone and may be able to make telephone calls, send/receive text messages, and relay information received from sensor units 104 via a wireless cellular communication channel.

The base station 102 may communicate wirelessly with the sensor units 104 in any suitable manner, such as via a low-power wireless communication protocol that has limited range. A low-power protocol with limited range may not transmit information outside the environment in which the network 100 is disposed. Examples of such low-power protocols include Wireless Personal Area Network (WPAN) protocols and Wireless Local Area Network (WLAN) protocols. Examples of WPAN protocols that may be used in embodiments include the BLUETOOTH™ and ZIGBEE® protocols, though any suitable WPAN protocol may be used. Examples of WLAN protocols that may be used in embodiments include any protocols of the Institute of Electrical and Electronics Engineers (IEEE) 802.11 protocol suite, though any suitable WLAN protocol may be used. It should be appreciated, though, that embodiments that use a low-power protocol to communicate between the base station 102 and sensor units 104 are not limited to using WPAN or WLAN protocols, or any of the examples of such protocols mentioned above, but rather may use any suitable low-power protocol, as embodiments are not limited in this respect.

Any suitable information may be communicated between the base station 102 and the sensor units 104. For example, the sensor units 104 may communicate to the base station 102 information regarding one or more environmental conditions being monitored. Where information regarding environmental conditions is transmitted, any suitable information may be transmitted in any suitable format, as embodiments are not limited in this respect. In some embodiments, the sensor units 104 may collect data regarding a condition and send that data as the information transmitted to the base station 102, while in other embodiments the sensor units 104 may process collected data in some manner and transmit results of the processing as information regarding a condition to the base station 102.

While the exemplary environmental sensor network 100 of FIG. 1A includes a base station 102 for relaying information from the sensor units 104 to devices outside the sensor network and outside the environment, embodiments are not limited to operating with base stations. In other embodiments, each of the sensor units 104 may include components for communicating information to devices outside of the network and outside of the environment and the sensor network. In some of the embodiments where sensor units are able to communicate outside the sensor network and outside the environment, the environmental sensor network may not include a base station, though in other embodiments one or more base stations may be provided in the sensor network.

An environmental sensor network of the type illustrated in FIG. 1A may be used in any suitable environment to monitor conditions of the environment. FIG. 1B illustrates the network 100 disposed in environment 120 that is a restaurant. The environment 120 includes freezers 122, 124, a kitchen 126, and a dining area 120 and the sensor units 104 of the network 100 are disposed in various locations in the environment 120 to monitor conditions at multiple locations of the environment. In the restaurant context, environmental conditions such as temperature can be important to monitor, particularly in connection with the freezers 122, 124 as the freezers 122, 124 may store supplies for the restaurant that might spoil if the temperature in the freezers 122, 124 strays outside acceptable operating ranges. To monitor temperature in the freezers, one sensor unit (in the case of freezer 122) or multiple sensor units (in the case of freezer 124) that are adapted to monitor temperature may be placed within the freezers 122, 124 and may collect data regarding the temperature. Information regarding the temperature may then be communicated from the sensor units to the base station 102 via a wireless signal. Other sensor units at other locations in the environment 120 may also collect data regarding environmental conditions in the rooms of the restaurant in which the sensor units are located and provide that information to the base station 102.

The base station 102 may take any suitable actions in response to receiving information on conditions of the environment from the sensor units 104. In some embodiments, the base station 102 may store the received information in a data store of the base station 102, such as a database that is maintained as a component of the base station 102. Additionally or alternatively, the base station 102 may transmit the information to a remote data store via a communication network using a connection-oriented or connectionless communication protocol. The remote data store to which the information is transmitted, which may be outside the environment in which the sensor network 100 is disposed, may be associated with the environmental sensor network 100, in that the remote data store may form, together with the sensor network 100, a part of an environmental monitoring system.

Figure 2:
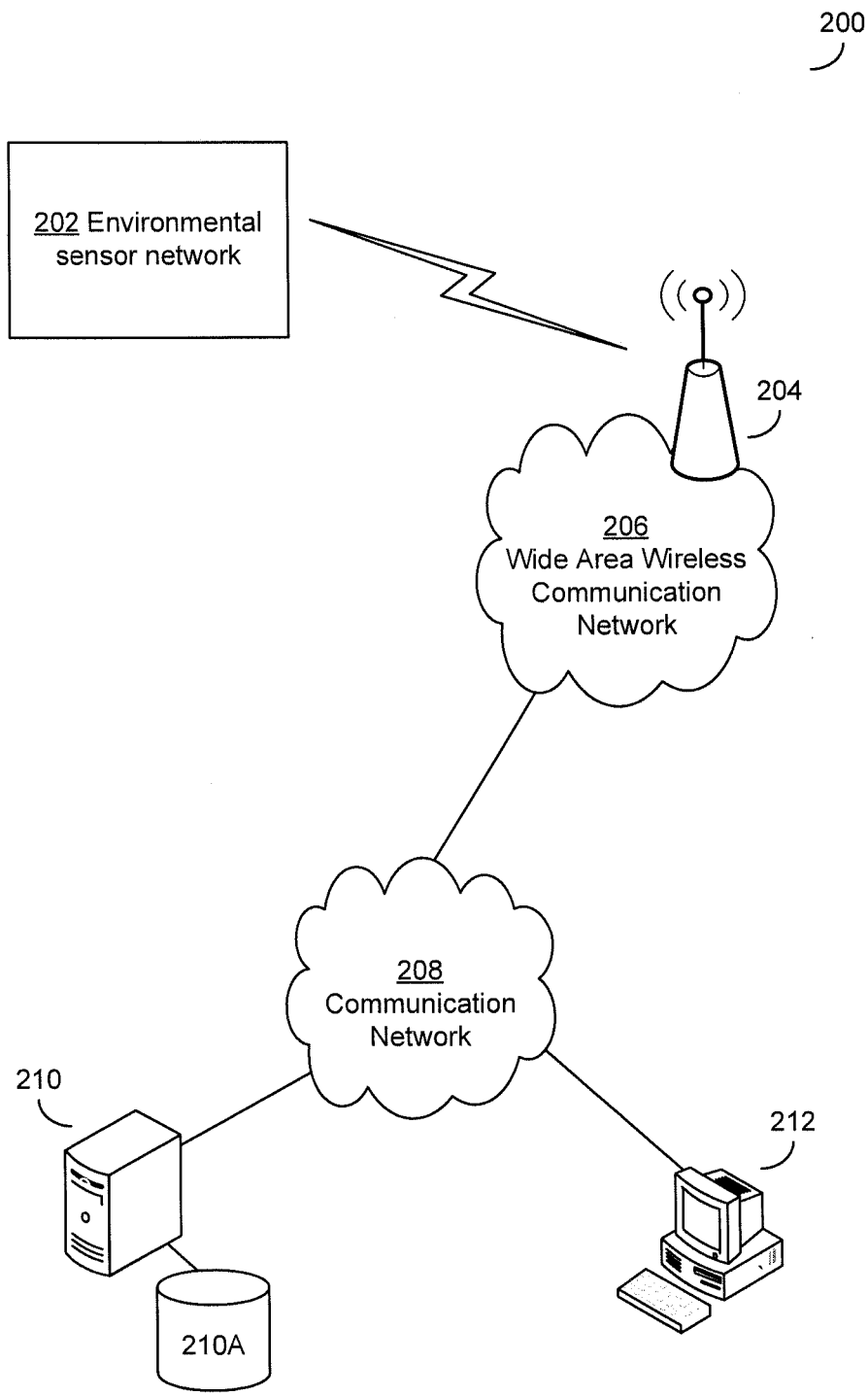
FIG. 2 is an illustration of an exemplary environmental monitoring system that may be used in some embodiments.

FIG. 2 illustrates an example of an environmental monitoring system with which some embodiments may operate. An environmental monitoring system includes at least one environmental sensor network, stores information for the environmental sensor network(s), and provides the information to users. Where an environmental monitoring system includes multiple environmental sensor networks, the environmental sensor networks may be placed within a same environment or different environments. Where there are different environments, the different environments may be managed by multiple different operators. Accordingly, an environmental monitoring system may, in some embodiments, store information regarding environments for multiple different operators.

The environmental monitoring system 200 includes an environmental sensor network 202 that may be disposed in an environment to monitor conditions in an environment and one or more servers 210 that are associated with a data store 210A. The environmental sensor network 202 may provide to the server(s) 210 and the data store 210A information that is communicated between sensor units and base stations, including information regarding conditions in the environment in which the network 202 is disposed.

To transmit the information to the server(s) 210, the environmental sensor network 202 may transmit the information regarding the conditions via at least one communication network. The transmission may be carried out in any suitable manner, as embodiments are not limited in this respect. In the example of FIG. 2, base stations of the environmental sensor network 202 transmit the information regarding the conditions in the environment to the server(s) 210 via a wireless communication protocol, which may be a high-power wireless communication protocol that is capable of transmitting information outside of the environment in which the environmental sensor network 202 is disposed. Such a high-power wireless protocol may be a Wireless Wide Area Network (WWAN) protocol. As illustrated in FIG. 2, the environmental sensor network 202 may transmit a wireless signal to an antenna 204 of a WWAN network 206. In some embodiments, the WWAN network 206 may be a cellular communication network and the antenna 204 may be a cell tower of the cellular communication network. In such embodiments, a base station of the environmental sensor network may include components to permit transmission of information via a cellular communication protocol, such as one of the Global System for Mobile Communications (GSM) protocols. When the antenna 204 receives a communication from the environmental sensor network 202, the antenna may relay the communication to the server(s) 210 via the network 206. Where the server(s) 210 are not connected to the network 206, the information from the sensor network 202 may also be transmitted via another communication network 208 that is any suitable network, including a local area network, an enterprise network, and/or the Internet.

The server(s) 210, upon receiving information from the environmental sensor network 202, may process and/or store the received information in the data store 210A in any suitable manner, as embodiments are not limited in this respect. The information that is received from the sensor network 202 and stored may include any suitable information, including information regarding conditions of an environment that the network 202 is monitoring and information regarding locations of sensor units of the environmental sensor network 202. The information may be stored for processing and/or review by an analysis facility, such as a facility that reviews the information and determines whether to raise an alert based on the review (e.g., when a temperature strays outside an acceptable operating range), and/or for review by a user who views the information via a user interface.

A user may operate a computing device 212 to communicate with the server(s) 210 to request information regarding the conditions of the environment and the server(s) 210 may respond to the request by presenting, via the computing device 212, a user interface to display the information stored in the data store 210A. The user may thereby view the information regarding conditions of the environment and take any suitable action based on the information. The user may be any suitable person authorized to view the information regarding the environment, such as a person associated with an operator of the environment. The operator of the environment may be a manager of the environment in which the sensor network 202 is disposed and may have placed the sensor network 202 in the environment or had the sensor network 202 placed in the environment. The operator of the environment may be any suitable entity that may manage an environment, such as a commercial or non-commercial entity or a human that owns and/or is responsible for the environment. A user that is associated with the operator may be the operator or may be a person affiliated with the operator, such as an employee, friend, or relative of the operator. Upon viewing the information regarding the conditions of the environment, the operator may perform various management operations based on the information, such as adjusting climate control of a room being monitored or other actions. Embodiments are not limited to working with users and/or operators that take any particular action based on information presented via the user interface.

The user interface by which the information is presented may be any suitable user interface. For example, in some embodiments, the user interface may include one or more web pages of a web site. Embodiments are not limited to presenting a user interface that includes any particular content or is in any particular format.

An environmental sensor network may be placed in an environment that is managed by a user and the environmental sensor network may be placed in communication with a server of an environmental monitoring system. The sensor network may be in communication with the server in any suitable way, including by a Wireless Wide Area Network (WWAN) connection between the sensor network and the server.

Figure 3:
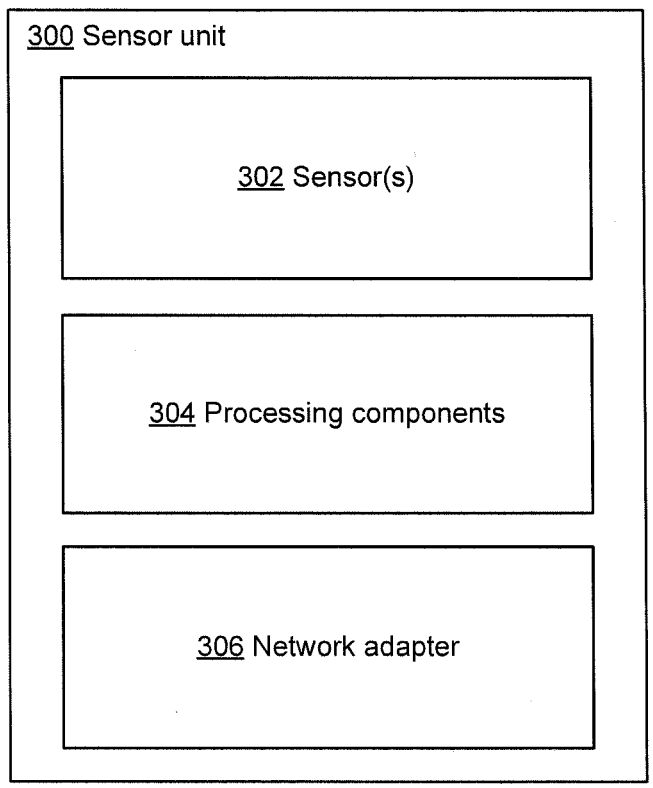
FIG. 3 is a block diagram of an exemplary sensor unit with which some embodiments may operate.

Embodiments are not limited to operating with any particular sensor units. FIG. 3 is a block diagram of some components of a sensor unit with which some embodiments may operate.

The sensor unit 300 of FIG. 3 includes various components for collecting information regarding one or more conditions of an environment in which the sensor unit is disposed. In the example of FIG. 3, these components include one or more sensors 302 that collect data regarding the conditions and processing components 304 that process at least some of the data collected by the sensors 302. Information regarding the conditions, which may include data collected by the sensors 302 and/or processed by the processing components 304, may be communicated from the sensor unit 300 via a network adapter 306. The network adapter 306 may transmit the information in any suitable manner, such as by transmitting the information via a WPAN or WLAN communication protocol and/or, in some embodiments, via a WWAN communication protocol.

FIG. 3 is an illustrative example of an architecture for a sensor unit. In some embodiments, a base station of an environmental sensing network may have a similar architecture. The architecture for a base station may not include sensor(s), as in some embodiments the base station may act as a relay device and may not participate in collecting data regarding conditions of a network. Though, in some embodiments, the base station may be implemented as a sensor unit that includes a component for communicating outside the environment or outside the sensor network. Additionally, even where the base station does not include any sensors, in some embodiments the base station may include processing components for processing data collected by sensors units. Further, the network adapter of a base station may include two adapters: a low-power adapter for communicating with sensor units and a high-power adapter for communicating with a wide-area network that extends beyond the environment. Though, it should be appreciated that embodiments are not limited to operating with any particular type of base station.

Figure 4:
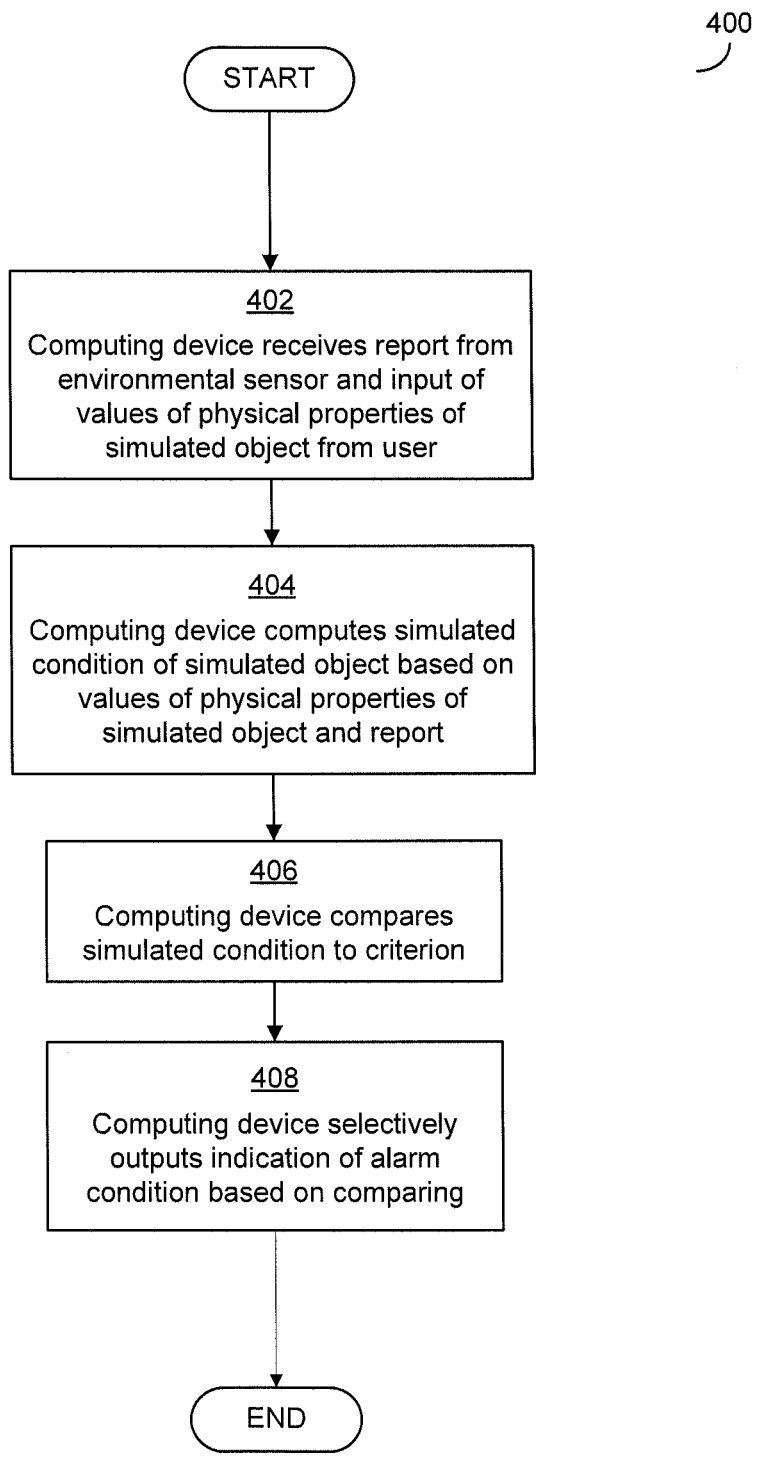
FIG. 4 is a flowchart of an exemplary technique for computing a simulated condition of a simulated object.

FIG. 4 shows an exemplary process that may be carried out by an environmental monitoring system to compute the simulated condition of a simulated object. The process of FIG. 4 may be implemented by programming of a computing device that processes reports from sensor units, such as server 210. In the example of FIG. 4, the sensor may measure the condition of the environment. Prior to the start of the process 400, the sensor may be placed in an environment managed by a user and placed in wireless communication with a server of the environmental monitoring system.

Prior to initiation of process 400, the computing device may be configured with information about the simulated object. This configuration may occur in any suitable way. For example, a user managing an environment may input that information. In the embodiment illustrated in FIG. 2, for example, a user may connect to server 210 over communication network 208 using a web browser or other known computer interface technology. The user may then log into an account for that user with which data about the environment sensor network 202 managed by that user is associated. The user inputs may include values of physical properties of the virtual object, which may be input in any of the ways described herein or in any other suitable way.

The user input may alternatively or additionally include one or more criterion for environmental conditions, including conditions within a simulated object. The criterion may, individually or collectively, indicate an operating state for which a user is to be notified such that, if met, the system may send a message that may alert the user or take other suitable action.

The process 400 begins in block 402, in which a computing device of an environmental monitoring system receives from an environmental sensor of the system one or more reports regarding at least one condition of the environment in which the environmental sensor is disposed. The report(s) received in block 402 may be any suitable information, including raw data collected by a sensor and/or information that results from a processing by the sensor of raw data. The computing device also receives an input of values of physical properties of a simulated object from a user through a user interface. In the illustrative embodiments described herein, those reports may represent measured temperatures.

In block 404, the computing device computes a simulated condition of the simulated object based on the values of physical properties of simulated object and the report received in block 402. This computation may be performed using any of the equations described herein or in any other suitable way.

In block 406, the computing device compares the simulated condition computed in block 404 to one or more criterion, as discussed above. The result of this comparison may be a determination that an alarm condition exists. The alarm condition, for example, may be that the temperature or other environmental condition, as simulated within the simulated object, exceeds a threshold or other limit. Alternatively or additionally, the alarm condition may be that the rate of change of the simulated environmental condition exceeds that threshold or other limit. However, an alarm condition may be determined in any suitable way, including ways as described herein.

In block 408, the computing device selectively outputs an indication of the alarm condition (described above) based on the comparing performed in block 406. The indication of the alarm condition may be output in any suitable way. For example, the indication may be a message sent over a computer network or a message sent over another communication network, such as the cellular telephone network in the form of an SMS message. However, any suitable technique for communicating information to one or more people, computers, or other devices may be used, including the techniques described herein.

The process 400 then may end with respect to the report being processed. The process 400 may be repeated for other reports as they are received. Moreover, though not shown in FIG. 4, other processing may be performed based on the received report. The report, or simulated conditions computed based on the report, may be stored for logging, trend analysis, or other purposes.

Figure 5:
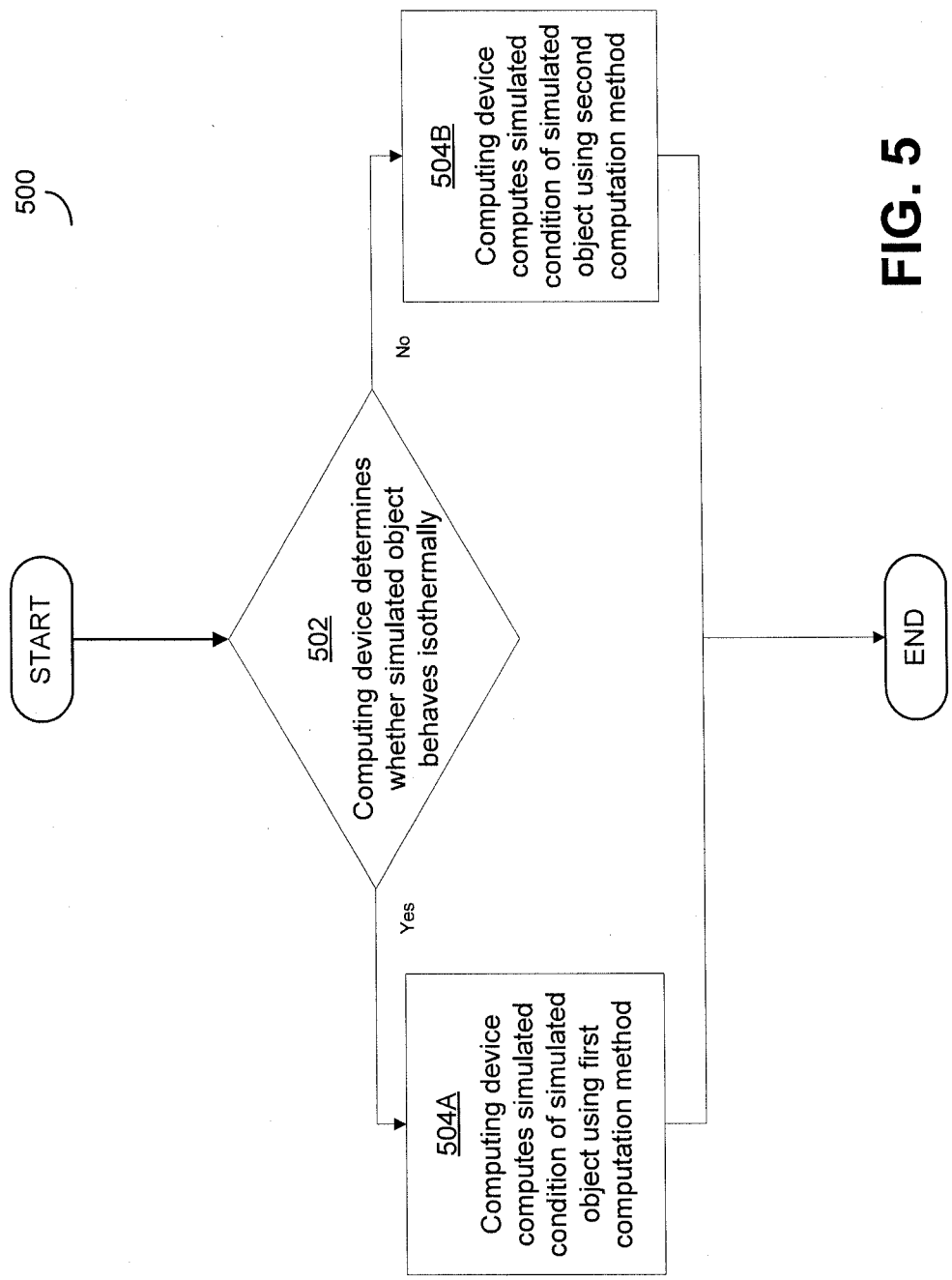
FIG. 5 is a flowchart of an exemplary sub-technique of the technique of FIG. 4.

FIG. 5 illustrates a sub-process expanding upon block 404 from process 400, in accordance with some exemplary embodiments. Sub-process 500 may be implemented by a computing device to compute a physical property of a simulated object. In this example, the physical property is an internal temperature of the simulated object.

The process 500 of FIG. 5 may begin in block 502, in which the computing device determines whether the simulated object behaves isothermally. Such a determination may be made in any suitable way. In some embodiments, the characteristics of the simulated object may be determined from information about the simulated object gleaned from user input defining the simulated object. In some scenarios, the characteristics of the simulated object may be input directly or may be inferred from other characteristics or information about the simulated object or object to be simulated.

If the simulated object behaves isothermally, in block 504A, the computing device computes the simulated condition of the simulated object using a first computation method (described above). If the simulated object does not behave isothermally, in block 504B, the computing device computes the simulated condition of the simulated object using a second computation method (described above). The process 500 then ends. Any suitable computation methods may be used, including those described herein.

Figure 6:
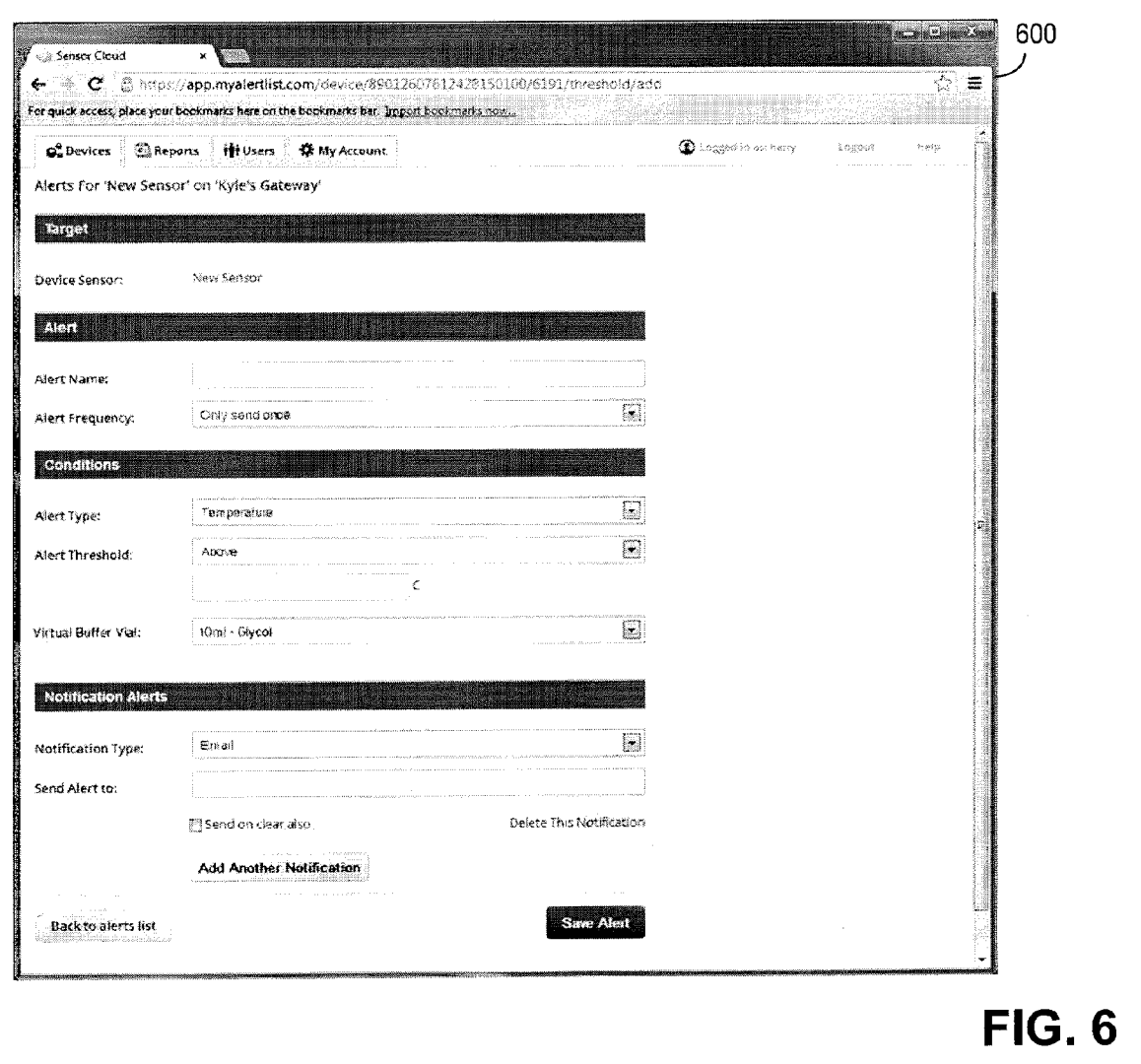

Embodiments are not limited to operating with any particular user interface. FIG. 6 illustrates an example of an user interface that may be used in some embodiments.

Techniques operating according to the principles described herein may be implemented in any suitable manner. Included in the discussion above are flow charts showing the steps and acts of various processes. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 8 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, including the exemplary computer system of FIG. 2, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 8:
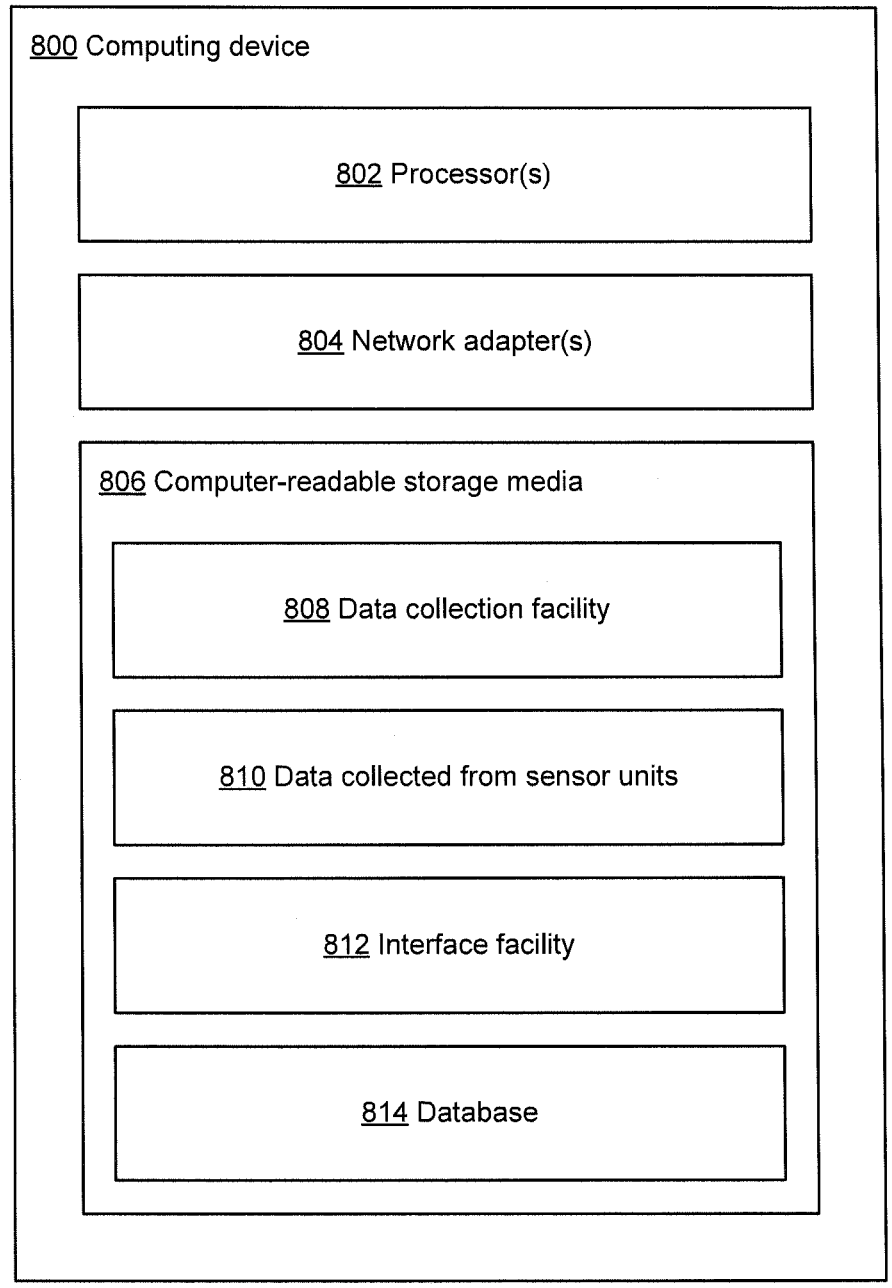
FIG. 8 is a block diagram of an exemplary computing device with which some embodiments may operate.

FIG. 8 illustrates one exemplary implementation of a computing device in the form of a computing device 800 that may be used in a system implementing the techniques described herein, although others are possible. It should be appreciated that FIG. 8 is intended neither to be a depiction of necessary components for a computing device to operate in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a server, a wireless access point or other networking element, or any other suitable computing device. Network adapter 804 may be any suitable hardware and/or software to enable the computing device 800 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 806 may be adapted to store data to be processed and/or instructions to be executed by processor 802. Processor 802 enables processing of data and execution of instructions. The data and instructions may be stored on the computer-readable storage media 806 and may, for example, enable communication between components of the computing device 800.

The data and instructions stored on computer-readable storage media 806 may comprise computer-executable instructions implementing techniques which operate according to the principles described herein. In the example of FIG. 8, computer-readable storage media 806 stores computer-executable instructions implementing various facilities and storing various information as described above. Computer-readable storage media 806 may store an information collection facility 808 that receives information communicated by one or more environmental sensor networks disposed in one or more environments. The information collection facility 808 may receive the data via the network adapter 804. The computer-readable storage media 806 may further store information 810 that has been received from the sensor networks and an interface facility 812 for presenting the information to a user. The interface facility 812 may present the information to the user via any suitable user interface, including via one or more web pages that may be transmitted to the user via the network adapter 804. The computer-readable storage media 806 may also store one or more databases 814 that contain information such as the values of the physical properties of potentially selectable simulated objects.

While not illustrated in FIG. 8, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of operating a computing device of an environmental monitoring system, the computing device processing at least one report from at least one environmental sensor in the environment, the method comprising:

computing, based on values of physical properties of a simulated object and the at least one report, a simulated condition of the simulated object within the environment;

comparing the simulated condition to a criterion, wherein the criterion comprises a parameter of the simulated object;

selectively outputting an indication of an alarm condition based on the comparing; and receiving through a user interface an input of the values of the physical properties of the simulated object, wherein:

the environment is managed by a user; and receiving through the user interface the input of the values of the physical properties of the simulated object comprises:

associating input with an account based on credentials issued to a user for the account; and receiving the input of the values of the physical properties of the simulated object from the user.

2. A method of operating a computing device of an environmental monitoring system, the computing device processing at least one report from at least one environmental sensor in the environment, the method comprising:
computing, based on values of physical properties of a simulated object and the at least one report, a simulated condition of the simulated object within the environment;
comparing the simulated condition to a criterion, wherein the criterion comprises a parameter of the simulated object; and
selectively outputting an indication of an alarm condition based on the comparing, wherein computing the simulated condition of the simulated object comprises:
determining whether the simulated object behaves isothermally;
if the simulated object behaves isothermally, computing the simulated condition of the simulated object using a first computation method; and
if the simulated object does not behave isothermally, computing the simulated condition of the simulated object using a second computation method.

3. The method of claim 2, wherein:
determining whether the simulated object behaves isothermally comprises determining a ratio of convection coefficient, surface area, conduction coefficient, and volume.

4. The method of claim 2, wherein:
the simulated condition of the simulated object comprises a simulated temperature of the simulated object; and
the at least one report comprises a plurality of instances of a measured temperature of the environment.

5. The method of claim 2, wherein:
the physical properties comprise convection coefficient, surface area, mass, and/or specific heat of the simulated object.

6. The method of claim 2, wherein:
the simulated object comprises a fluid characteristic of a medical product.

7. The method of claim 2, wherein:
the simulated object comprises a food product.

8. The method of claim 2, wherein:
the simulated object is stored in a container.

9. At least one computer-readable storage medium encoded with computer-executable instructions that, when executed by at least one computer, cause the at least one computer to carry out a method of operating a computing device of an environmental monitoring system, the computing device processing at least one report from at least one environmental sensor in the environment, the method comprising:
computing, based on values of physical properties of a simulated object and the at least one report, a simulated condition of the simulated object within the environment;
comparing the simulated condition to a criterion, wherein the criterion comprises a parameter of the simulated object;
selectively outputting an indication of an alarm condition based on the comparing, and
receiving through a user interface an input of the values of the physical properties of the simulated object, wherein:
the environment is managed by a user; and
receiving through the user interface the input of the values of the physical properties of the simulated object comprises:
associating input with an account based on credentials issued to a user for the account; and
receiving the input of the values of the physical properties of the simulated object from the user.

10. An environmental monitoring system that processes at least one report from at least one environmental sensor in the environment, the environmental monitoring system comprising:
a computing device configured to:
compute, based on values of physical properties of a simulated object and the at least one report, a simulated condition of the simulated object within the environment;
compare the simulated condition to a criterion; and
selectively output an indication of an alarm condition based on the comparing, wherein:
the environment is managed by a user; and
the computing device is further configured to:
receive through a user interface an input of the values of the physical properties of the simulated object; and
associate input with an account based on credentials issued to a user for the account.

11. The environmental monitoring system of claim 10, wherein:
the input of the values of the physical properties of the simulated object comprises a selection of the simulated object.

12. An environmental monitoring system that processes at least one report from at least one environmental sensor in the environment, the environmental monitoring system comprising:
a computing device configured to:
compute, based on values of physical properties of a simulated object and the at least one report, a simulated condition of the simulated object within the environment;
compare the simulated condition to a criterion; and
selectively output an indication of an alarm condition based on the comparing, wherein computing the simulated condition of the simulated object comprises:
determining whether the simulated object behaves isothermally;
if the simulated object behaves isothermally, computing the simulated condition of the simulated object using a first computation method; and
if the simulated object does not behave isothermally, computing the simulated condition of the simulated object using a second computation method.

13. The environmental monitoring system of claim 12, wherein:
determining whether the simulated object behaves isothermally comprises determining a ratio of convection coefficient, surface area, conduction coefficient, and volume.

14. The environmental monitoring system of claim 10, wherein:
the simulated condition of the simulated object comprises a simulated temperature of the simulated object; and
the at least one report comprises a plurality of instances of a measured temperature of the environment.

15. The environmental monitoring system of claim 10, wherein:
the physical properties comprise convection coefficient, surface area, mass, and/or specific heat of the simulated object.

16. The environmental monitoring system of claim 10, wherein:

the simulated object comprises a fluid characteristic of a medical product.

17. The environmental monitoring system of claim 10, wherein:
the simulated object comprises a food product.

18. The environmental monitoring system of claim 10, wherein:
the simulated object is stored in a container.

19. The method of claim 1, wherein:
the simulated condition of the simulated object comprises a simulated temperature of the simulated object; and
the at least one report comprises a plurality of instances of a measured temperature of the environment.

20. The method of claim 1, wherein:
the physical properties comprise convection coefficient, surface area, mass, and/or specific heat of the simulated object.

21. The method of claim 1, wherein:
the simulated object comprises a fluid characteristic of a medical product.

22. The method of claim 1, wherein:
the simulated object comprises a food product.

23. The method of claim 1, wherein:
the simulated object is stored in a container.

* * * * *